United States Patent
Copsey

(10) Patent No.: US 9,411,978 B2
(45) Date of Patent: Aug. 9, 2016

(54) SYSTEM AND METHOD FOR ACCESS CONTROL USING NETWORK VERIFICATION

(71) Applicant: Open Text S.A., Luxembourg (LU)

(72) Inventor: Simon Dominic Copsey, Horsham (GB)

(73) Assignee: Open Text S.A., Luxembourg (LU)

( * ) Notice: Subject to any disclaimer, the term of this patent is extended or adjusted under 35 U.S.C. 154(b) by 95 days.

(21) Appl. No.: 14/329,698

(22) Filed: Jul. 11, 2014

(65) Prior Publication Data

US 2015/0020214 A1   Jan. 15, 2015

Related U.S. Application Data

(60) Provisional application No. 61/845,109, filed on Jul. 11, 2013.

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/62* | (2013.01) | |
| *H04L 29/06* | (2006.01) | |

(52) U.S. Cl.
CPC .... *G06F 21/6218* (2013.01); *G06F 2221/2111* (2013.01); *H04L 63/10* (2013.01)

(58) Field of Classification Search
CPC ............... G06F 2221/2141; H04L 63/107; H04L 63/101; H04L 41/28; H04W 12/08; H04W 48/02; H04W 48/16; H04W 48/20
See application file for complete search history.

(56) References Cited

U.S. PATENT DOCUMENTS

| | | | |
|---|---|---|---|
| 6,058,302 A | 5/2000 | Westerberg | |
| 7,391,748 B2 | 6/2008 | Feather | |
| 7,448,080 B2 | 11/2008 | Karjala et al. | |
| 7,463,637 B2 | 12/2008 | Bou-Diab et al. | |
| 7,961,725 B2 | 6/2011 | Nagarajan et al. | |
| 8,275,356 B2 | 9/2012 | Hickie | |
| 8,326,981 B2 | 12/2012 | Tock et al. | |
| 8,359,644 B2 | 1/2013 | Killian et al. | |
| 8,401,522 B2 | 3/2013 | Crawford et al. | |
| 8,886,925 B2 * | 11/2014 | Qureshi | H04L 63/20 713/150 |
| 2007/0150946 A1 | 6/2007 | Hanberger et al. | |
| 2009/0129338 A1 * | 5/2009 | Horn | H04W 48/10 370/331 |
| 2009/0247125 A1 * | 10/2009 | Grant | H04M 1/7253 455/411 |
| 2009/0300721 A1 | 12/2009 | Schneider | |
| 2009/0327305 A1 | 12/2009 | Roberts et al. | |
| 2011/0116442 A1 * | 5/2011 | Caldwell | H04W 12/08 370/328 |
| 2011/0145893 A1 | 6/2011 | Tock et al. | |

(Continued)

OTHER PUBLICATIONS

"Enterprise Remote Access", F5 Networks, Inc., Sep. 2005, 5 pgs. at http://www.f5.com/pdf/white-papers/enterprise-remote-access-wp.pdf.

(Continued)

*Primary Examiner* — Amir Mehrmanesh
*Assistant Examiner* — Quy Pham
(74) *Attorney, Agent, or Firm* — Sprinkle IP Law Group

(57) ABSTRACT

A system for controlling access includes a computing device, configured to: determine a first identifier associated with a first access point being used by the computing device to access a network; determine first access control data associated with the first identifier and a first application executing on the computing device; and control access to data over the network by the first application based on the first access control data.

19 Claims, 7 Drawing Sheets

(56) References Cited

U.S. PATENT DOCUMENTS

| | | |
|---|---|---|
| 2011/0208838 A1 | 8/2011 | Thomas et al. |
| 2011/0225637 A1 | 9/2011 | Counterman |
| 2011/0252230 A1 | 10/2011 | Segre et al. |
| 2011/0252464 A1 | 10/2011 | Sanjeev |
| 2012/0159607 A1 | 6/2012 | Wei et al. |
| 2012/0270522 A1 | 10/2012 | Laudermilch et al. |
| 2012/0270523 A1 | 10/2012 | Laudermilch et al. |
| 2013/0029641 A1 | 1/2013 | Hickie |
| 2014/0108793 A1* | 4/2014 | Barton ............... G06F 21/6218 713/165 |

OTHER PUBLICATIONS

"Identity-Based Networking Services", Cisco Systems, Inc., San Jose, CA and IBM Global Services, Somers, NY, 2004, 6 pgs. at http://www-03.ibm.com/security/cisco/docs/inv-956464-100704.pdf.

"Network Access Control for Mobile Networks", Aruba Networks, Inc., Sunnyvale, CA, 2013, 12 pgs. at http://www.arubanetworks.com/pdf/technology/whitepapers/wp_NAC_MobileNetworks.pdf.

* cited by examiner

SYSTEM AND METHOD FOR ACCESS CONTROL USING NETWORK VERIFICATION

CROSS REFERENCE TO RELATED APPLICATIONS

This application claims the benefit of priority to U.S. Provisional Patent Application Ser. No. 61/845,109, filed Jul. 11, 2013, entitled SYSTEM AND METHOD FOR ACCESS CONTROL USING NETWORK VERIFICATION, which is hereby incorporated by reference for all purposes as if fully set forth herein.

TECHNICAL FIELD

This disclosure relates generally to systems and methods for access control. Specifically, this disclosure relates to systems and methods for implementing access controls in conjunction with applications on a device based on an identifier associated with a network access point.

BACKGROUND

In today's heterogeneous computing environments, users may have multiple computing devices (e.g., mobile devices, tablet, laptop, desktop computer, etc.) with multiple applications available to the user on each device, where those devices may, in turn, be used in multiple environments or locales. These users may be members or otherwise associated with (e.g., employees, users, etc.) a particular enterprise and use these computing devices to access computing devices or data associated with that enterprise.

It is often the case however, that some of the data and systems accessed by these users is sensitive in nature. Enterprises therefore may wish to restrict or otherwise control access to these systems or data. Typical access controls may be not be sufficient due, for example, to the myriad ways in which a user may access the enterprises systems and data. In particular, accesses from users using a mobile computing device may present significant security risks, as such devices may access the enterprise over a network (e.g., the Internet or an intranet) from a number of access points (e.g., wireless access points such as routers or wireless gateways, etc.). These access points or the environments in which they operate may not be secure and thus users accessing an enterprise's system or data using such access points may expose these systems or data to unauthorized access.

SUMMARY

A system for controlling access, in accordance with embodiments includes a computing device, configured to: determine a first identifier associated with a first access point being used by the computing device to access a network; determine first access control data associated with the first identifier and a first application executing on the computing device; and control access to data over the network by the first application based on the first access control data.

In some embodiments, determining the first access control data includes sending a request to an access control update server and receiving the first access control data from the access control update server, the request comprising the first identifier. In some embodiments, the computing device is further configured to update the first access control data by sending a request to an access control update server and receiving updated first access control data from the access control update server. In some embodiments, the first application comprises an access control module configured to perform the determining of the first identifier, the determining of the access control data and the controlling of access to data. In some embodiments, the computing device is further configured to: determine a second identifier associated with a second access point being used by the computing device to access the network; determine second access control data associated with the second identifier and the application; and control access to data by the application based on the second access control data.

In some embodiments, the first access control data is a default level of access. In some embodiments, the first access control data includes environmental data associated with at least one of the computing device or the first access point. In some embodiments, the environmental data includes geographical data associated with the computing device or the first access point.

In some embodiments, the computing device is further configured to: determine a second access control data, the second access control data associated with the first identifier and a second application executing on the computing device; and control access to data over the network by the second application based on the second access control data. In some embodiments, the first access control data specifies a different level of access than the second access control data. In some embodiments, the first application and second application are isolated applications. In some embodiments, each of the first application and the second application comprises an access control module. In some embodiments, the computing device is configured to execute an access control module that controls access to data by the first application and the second application. In some embodiments, the computing device is configured to determine if a path to a target server is an acceptable path and, in response to determining that the path is not an acceptable path, blocking access by the first application to the target server.

A method for controlling access to a target platform by a computing device, in accordance with embodiments includes determining a first identifier associated with a first access point being used by the computing device to access a network; determining first access control data associated with the first identifier and a first application executing on the computing device; and controlling access to data associated with the target platform by the first application based on the first access control data.

In some embodiments, determining the first access control data includes sending a request to an access control update server and receiving the first access control data from the access control update server, wherein the request comprises the first identifier. In some embodiments, the method includes updating the first access control data by sending a request to an access control update server and receiving updated first access control data from the access control update server. In some embodiments, the application includes an access control module configured to perform the determining of the first identifier, the determining of the access control data and the controlling of access to data. In some embodiments, the method includes determining a second identifier associated with a second access point being used by the computing device to access the network; determining second access control data associated with the second identifier and the application; and controlling access to data by the first application based on the second access control data.

In some embodiments, the first access control data is a default level of access. In some embodiments, the first access control data includes environmental data associated with at least one of the computing device or the first access point. In some embodiments, the environmental data includes geographical data associated with the computing device or the first access point.

In some embodiments, the method further includes determining second access control data, the second access control data associated with the first identifier and a second application executing on the computing device; and controlling access to data over the network by the second application based on the second access control data. In some embodiments, the first access control data specifies a different level of access than the second access control data. In some embodiments, the first application and second application are isolated applications.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DETAILED DESCRIPTION

Figure 1:
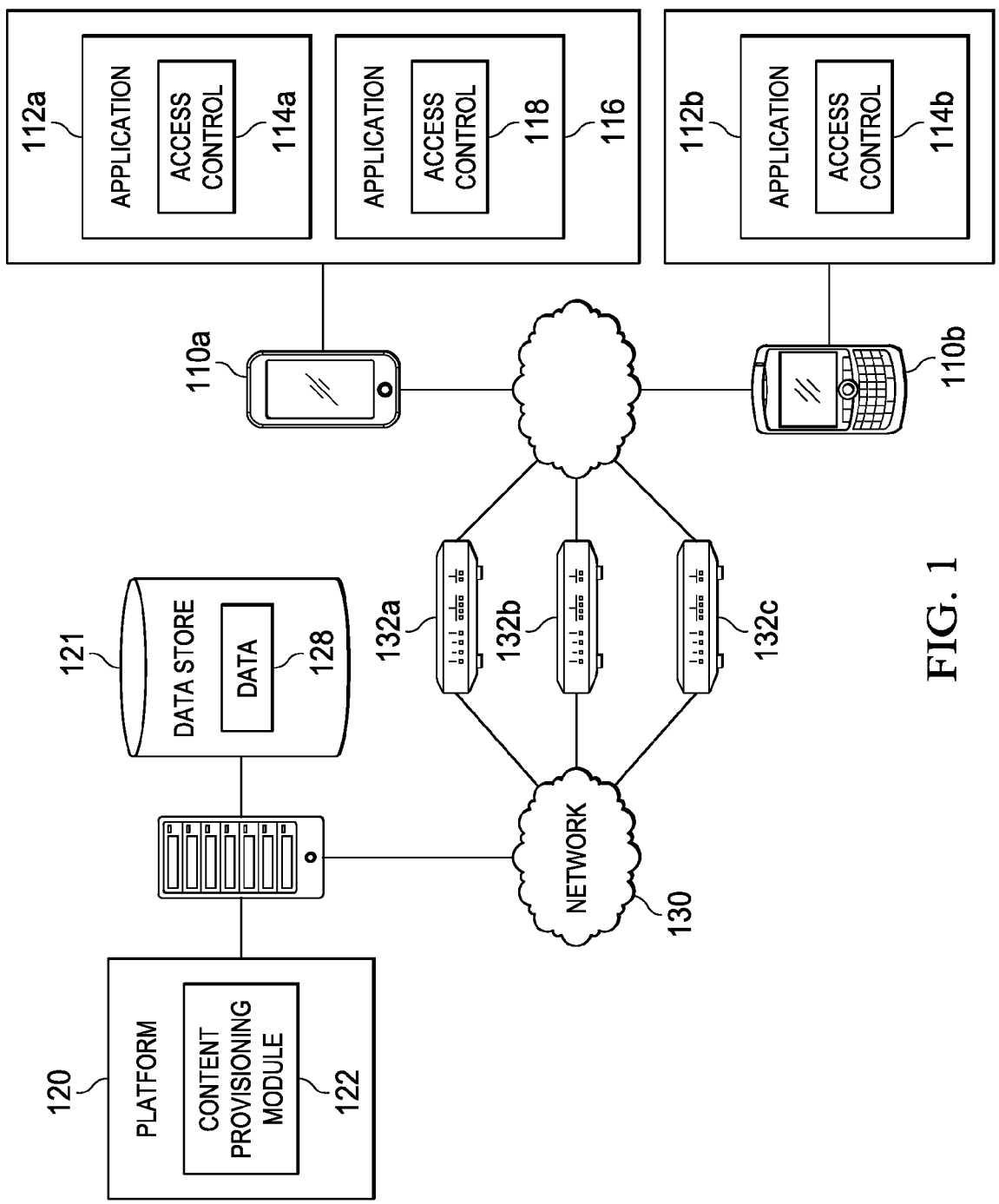
FIG. 1 is a block diagram illustrating one embodiment of an architecture for access control.

Embodiments and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

Embodiments for access control address security issues by allowing (or restricting) a user access to an enterprise's systems or data based on an access point which the user's computing device is utilizing to access a network. To that end, attention is now directed to the systems and methods for controlling access presented herein. Specifically, in certain embodiments, a user's computing device may access a network using an access point, where the access point has a device identifier identifying the access point (e.g., a media access control (MAC) address, factory burned-in identifier, serial number, etc.). The user may utilize an application on his device to access data within an enterprise. The application may determine the device identifier associated with the access point being used to access the network and allow (or restrict) access to the data at the enterprise based on the device identifier associated with the access point.

In particular, when an application on a user's computing device is activated, or when the application first attempts to access data at an enterprise (or first attempts to access data which it is desired to secure), a device identifier associated with the access point being used by the computing device to access a network may be determined. Access control data associated with the device identifier and the application can then be determined and access to data at the enterprise controlled based on this access control data.

In one embodiment, the application may include an access control list of device identifiers for access points and access control data associated with each of the device identifiers for the access points such that access to the data at the enterprise can be controlled based on which access point the computing device is utilizing to access the network (and, in some embodiments, the application accessing the data). Access control data may be associated individually with a device identifier for an access point or with groups of device identifiers for access points such that access to data may be controlled at a desired level of granularity based on which particular access point is being utilized.

For example, a user accessing data through an access point in a board room of an enterprise may have access to financial data of the enterprise but that same user on the same device using the same application may not access this financial data when accessing data through an access point in the cafeteria of the enterprise. The access control list may thus contain a set of trusted access points (also referred to as a "white list") such that these trusted access points can make up a trusted network access infrastructure of the enterprise.

In one embodiment, access control data associated with a default level of access may be associated with one or more access points whose device identifier is on the access control list. Thus, if a device identifier for such an access point is matched to a device identifier on the access control list a default level of access may be grated (e.g., all privileges are active, Read, Write, Lock privileges may be granted, etc.).

Alternatively, access control data associated with another default level of access may be used to control access to data in conjunction with access points whose device identifier is not on the access control list. In other words, in some embodiments access control data may also be determined for device identifiers that are not on the access control list (e.g., these device identifiers may be associated with access control data for a default level of access). Such a default access level may specify, for example, that only data designated public by the enterprise may be accessed, all access may be disallowed, the application may be prevented from starting, access may be limited to read only access, access may be limited to download of unprotected, non-sensitive information, etc.

Such access control lists and access control data may be determined or created in a variety of manners. For example, in certain embodiments an enterprise (or an administrator or security compliance officer associated with the enterprise) may create the access control list based on the device identifiers of access points owned or controlled by the enterprise or device identifiers for whose security has been verified in some manner by the enterprise. In other embodiments, an access control list may include device identifiers for access points that have been verified by a third party, etc. Thus, device identifiers on an access control list may include device identifiers for access points outside the physical plant or direct control of the enterprise if such access points can be verified as secured (e.g., access points in other businesses, public locations such as airports, etc.).

Additionally, the access control data associated with device identifiers may specify almost any type of access according to almost any permutation desired. For example, access control data associated with device identifiers for access points owned or controlled by the enterprise may specify one level of access while access control data associated with device identifiers for access points verified by the enterprise or a third party (e.g., not owned or controlled by the enterprise) may specify a more restrictive level of access. As another example, access control data associated with device identifiers for access points owned or controlled by the enterprise that are in one location of the enterprise (e.g., board room) may specify one level of access (e.g., full access to all data) while access control data associated with device identifiers owned or controlled by the enterprise in another location of the enterprise (e.g., outside the board room) may specify a more restrictive level of access (e.g., no access to financial documents). Other arrangements are possible and are fully contemplated herein.

In some embodiments, the access control data may specify access based not only on an access point identifier, but also on other information. For example, some embodiments may additionally make use of environmental information. This may include, for example, temperature, a geographical (e.g., GPS) coordinate, whether the user device is able to detect a particular network, whether other access devices are detected, and route tracing, e.g., based on whether a path to a target server is acceptable. This may be based, for example, on how many "hops" or links between access devices or servers are required for the communication to the platform. Depending on what additional information the device sees, a level of access may be specified or no access at all may be allowed.

For example, in one embodiment, if the user device detects a particular first access point as well as a particular second access point, then it may be allowed to have complete access. If the user device detects the first access point but not the second access point, then it may be allowed a more restricted level of access, or no access at all.

In an embodiment employing route tracing, access may be allowed, by tracing the route, i.e., the locations of servers and other links in the connection to the desired endpoint, and analyzing aspects of the route. For example, access may be allowed if there are fewer than a predetermined number of links (or hops); if all the links are within a particular geographical region; if the geographical length of the route is less than a predetermined or expected amount; and if no links are in particular proscribed regions. A geographical location database, for example, may be accessed to determine regions associated with particular links based, for example, on an IP address using public or private databases.

Additional embodiments may base access on a particular access provider. For example, a nonsecure application may be allowed to access any network, but a secure application in accordance with embodiments may be prevented from accessing the backend platform if the network is not provided by an approved provider or carrier. Thus, in some embodiments, each application may be provided with secure access functionality, while in others, only those that would access the backend platform may be provided with such functionality.

Access control data may be obtained in a variety of manners according to various embodiments presented herein. For example, an access control list may be included with an application when the application is created, installed, updated or otherwise deployed on a user's computing device. Moreover, the access control list may be updated at a subsequent point by requesting an access control list and receiving such a current access control list from a location (e.g., a URL, FTP site, etc.) associated with the enterprise, or may be updated by otherwise receiving such an access control list (e.g., without first sending a request for such a list). When the updated access control list is received by the application, the application may store the updated access control list (e.g., overwriting the previous version of the access control list). These updates to the access control list may be time-based updates (e.g., at regular intervals), event-based updates, security breach based updates, or may occur based on other events or criteria.

In some embodiments, however, such an access control list may not be included with the application. In such embodiments, the access control data may be obtained when such data is needed. For example, when access control data is required the application may request an access control list from a location associated with the enterprise and use the received access control list to determine the access control data associated with a device identifier. Alternatively, when access control data associated with a device identifier is required by the application, the application may send the device identifier to a location associated with the enterprise and receive access control data associated with that device identifier in response to this request. In either case, access updates may themselves be restricted to particular access points.

It may now be helpful here to discuss embodiments of various architectures that may be utilized in performing embodiments as disclosed herein. Referring first to FIG. 1, one embodiment of an architecture for access controls is depicted. The architecture includes one or more computing devices 110 (e.g., computing device 110a and computing device 110b) (referred to herein also as a user device) connected to a content provisioning platform 120 over a network 130. The network 130 may be a wired or wireless network such as the Internet, an intranet, a LAN, a WAN, a cellular network, another type of network. It will be understood that network 130 may be a combination of multiple different kinds of wired or wireless networks.

Computing devices 110 may be mobile devices (such as smartphones, laptop computers, personal data assistants (PDAs), etc.), desktop computers, servers, or other computing platforms, or any other type of device that can process instructions and connect to network 130. More specifically, computing devices 110 may access network 130 using an access point 132 (e.g., access point 132a, access point 132b or access point 132c). Such an access point 132 may communicate with computing device 110 wirelessly (using for example, a wireless communication standard such as 802.11) or over a wired network to allow computing device 110 to connect to network 130. Such access points 132 may include, or be coupled to, for example, a router, a gateway, or the like.

Each of the access points 132 may include a device identifier. Such a device identifier may, in one embodiment, uniquely identify the access point 132. An identifier may be, for example, a MAC address, a base station identifier (BSSID), Extended Service Set Identifier (ESSID), a number or code placed in hardware of the device by a manufacturer of the device, a serial number, etc.

Thus, as a mobile computing device 110 moves about in the environment it may utilize different access points 132 to access network 130. For example, a mobile device 110 may be in one location (e.g., a coffee shop) which includes an access point 132a and subsequently move to another location (e.g., an office) and access the network 130 through another access point 132b. It will be apparent therefore that some of these access points 132 may be publicly accessible and lack security while other access points 132 may be internal to certain environments (e.g., within an enterprise) and be protected by various security mechanisms (e.g., software or physical security).

Platform 120 may include one or more servers or other computing devices providing one or more content provisioning modules 122 accessible at one or more locations (e.g., IP addresses or domain names) or through one or more interfaces. The modules of a particular platform 120 may be deployed on physical computing devices residing at a particular location (such as those associated with the enterprise providing a particular mobile application) or may be deployed in a cloud. Thus, when a platform 120 is deployed in the cloud, one or more content provisioning modules 122 may be executing on a virtual machine provided in the cloud, where the virtual machine is addressable at a single (or more) location(s).

Regardless of the location of the platform 120, the content provisioning module 122 of a platform 120 may support access from applications 112 on a computing device 110. In other words, users at computing devices 110 may activate an application 112 on their computing device 110 (e.g., application 112a on computing device 110a and application 112b on computing device 110b) to access content provisioning module 122 (or which may access content provisioning module 122 during execution, etc.). In response to such access, content provisioning module 122 may provide application data 128 from data store 121 to the accessing application 112 at the computing device 110. This data may include documents, including for example, files in a proprietary format (e.g., Adobe .pdf, Microsoft Word, Excel, Power Point), files in a generic open format (e.g., mp3, mpeg, jpeg, etc.) files in a markup language (XML, HTML, etc.) or practically any other type of file, content or other data. Thus, for example, content provisioning module 122 may be a content management system that provides access, control and management of documents in data store 121.

As has been discussed, computing devices 110 may be accessing network 130 (and thus platform 120) from various access points 132 some of which may be associated with the enterprise that is providing platform 120. Accordingly, it may be desired to restrict an application 112's access to platform 120 or data 128 based on which access point 132 the device 110 on which application 112 resides is using to access the network 130. For example, it may be desired to allow one level of access to data 128 if the computing device 110 is using an access point 132a to access the network while allowing a different, more restrictive level of access to such data is using access point 132b (or to deny access to such data 128 altogether). As another example, it may be desirable to control access based on which access point 132 within an enterprise is used by computing device 110 to access network 130. For example, it may be useful to provide access to certain financial data through access point 132a if the access point 132a is within a board room of an enterprise and deny (or limit, e.g., read only) access to this financial data through access point 132c if the access point 132c is within the enterprise but not within the board room, etc.

To control access from applications 112 on computing devices 110 to platform 120 or data 128, application 112 may include an access control module 114 (e.g., access control module 114a and access control module 114b). This access control module 114 may be included by the developers of application 112, may be installed along with the application 114 when the application 112 is installed or deployed or configured in some other manner.

When the application 112 on the computing device 110 is activated, or when the application first attempts to access data 128 at platform 120, etc., access control module 114 may be activated. Access control module 114 is configured to determine the device identifier associated with the access point 132 being used by the computing device 110 to access network 130. In one embodiment, access control module 114 may determine the device identifier for the access point 132 by examining the communications (e.g., packets) sent from access point 132 to computing device 110 and application 112.

When the access control module 114 of the application 112 determines the device identifier for the access point 132 being used to access the network 130 it may then determine access control data associated with that device identifier. As will be discussed in more detail later, this determination may include accessing an access control list comprising a set of device identifiers where each device identifier is associated with access control data. The device identifier may be matched against the set of device identifiers in the access control list to determine if that device identifier is in the access control list. If the device identifier is in the access control list the access control data associated with the device identifier may be determined. If the device identifier is not in the access control list a default level of access may be used as the access control data (e.g., deny all access, permit only read access, etc.).

Alternatively, this determination (of access control data) may include sending a request including the device identifier to an access control update server (not shown). The access control update server may receive the request and return access control data associated with the device identifier to the access control module.

Once the access control data associated with the device identifier for the access point 132 is determined (e.g., determined from an access control list, determined to be a default level of access, etc.), the access control module 114 of the application 112 may control access by the application 112 to the application data 128 in accordance with this access control data. This control may include, for example, intercepting requests for such application data 128 before they are sent by the application 112, determining if the requested application data 128 can be accessed using the determined access control data and sending the request only if the application 112 is allowed to access the requested application data 128. If the application 112 is not allowed to access the requested application data 128, an error message or access denied message may be sent to the application 112 or user of the application 112.

Similarly, application data 128 intended for application 112 can be received by access control module 114 and access control module 114 configured to determine if the application 112 is allowed to access the data 128 using the determined access control data. The application data 128 can then be provided to the application 112 if it is determined that the application 112 can access the application data 128. The application data 128 may be discarded otherwise and, in some embodiments, an error message or access denied message sent to the application 112 or user of the application 112.

As can be seen then, access control module 114 of application 112 is configured to control access to platform 120 or application data 128 by application 112 based on access point 132 used by computing device 110 to access the network 130. It will be noted therefore, that the same application 112 on different computing devices 110 may be granted different levels of access if the computing devices 110 on which they are installed are using different access points 132 to access network 130.

An example may be illustrative here. Suppose for purpose of this example that access point 132a is an access point that is owned and controlled by the enterprise that is providing platform 120 such as an access point internal to the physical plant of the enterprise (e.g., in a conference room of the enterprise), while access point 132b is an access point that is publicly accessible, such as an access point at a coffee shop or an airport. Further suppose that computing device 110a is accessing network 130 using access point 132a while computing device 110b is accessing network 130 using access point 132b. Additionally, suppose that the default access control data is to deny all access while the access control data for any device identifiers listed in an access control list is to allow full access to application data 128.

Here, when application 112a on computing device 110a is activated (or when the application first attempts to access data 128 at platform 120, etc.), access control module 114a may be activated. Access control module 114a may determine the device identifier associated with the access point 132a being used by the computing device 110a to access network 130. The access control module 114a of the application 112a may then determine access control data associated with that device identifier (e.g., the device identifier for access point 132a). Specifically, an access control list may be accessed to see if that device identifier (e.g., for access point 132a) matches any of the device identifiers listed in the access control list. In this example, as access point 132a is controlled by the enterprise, the device identifier for access point 132a may be listed in the access control list.

The access control data associated with the device identifier (e.g., for access point 132a) in the access control list can then be determined. In this case, the access control data specifies full access to application data 128. Accordingly, access control module 114a may allow application 112a access to application data 128 on the platform 120.

Similarly, when application 112b on computing device 110b is activated (or when the application first attempts to access data 128 at platform 120, etc.), access control module 114b may be activated. Access control module 114b may determine the device identifier associated with the access point 132b being used by the computing device 110b to access network 130. The access control module 114b of the application 112b may then determine access control data associated with that device identifier (e.g., the device identifier for access point 132b). Specifically, an access control list may be accessed to see if that device identifier (e.g., for access point 132b) matches any of the device identifiers listed in the access control list. In contrast to the above example, in this case as access point 132b is not controlled by, or known to, the enterprise, the device identifier for access point 132b may not be listed in the access control list.

As, in this example, the device identifier for access point 132b is not in the access control list, a default level of access may be used as access control data. Here, the default level of access is to deny all access by an application to application data 128. Accordingly, access control module 114b may deny application 112b any access to application data 128 on the platform 120.

As can be seen from the above example, using embodiments as presented herein, accesses of the same application 112 on two different devices 110 may be controlled differently based on the access point 132 each device 110 and application 112 is using to access the network 130.

To continue with the above example, suppose now a user of device 110a activates application 116. Here, access control module 118 may be activated. Access control module 118 may determine the device identifier associated with the access point 132a being used by the computing device 110a to access network 130. The access control module 118 of the application 116 may then determine access control data associated with that device identifier (e.g., the device identifier for access point 132a). Specifically, an access control list may be accessed to see if that device identifier (e.g., for access point 132a) matches any of the device identifiers listed in the access control list to determine access control data associated with the device identifier in the access control list can then be determined.

Suppose here, that the access control list used by application 112a is different than the access control list used by access control module 118 of application 116 and that each of these access control lists specifies different access control data associated with the device identifier for access point 132a. As may be realized then, application 112a may be allowed a different level of access to application data 128 than application 116 despite that fact that the same access point 132a is being used to access the network 130 in conjunction with the access of both these applications 112a, 116 to application data 128.

To continue further with this example, suppose now that the user of device 110a moves his physical location such that device 110a is now using access point 132b to access the network 130. Here, access control module 114a may detect or be notified (e.g., by an operating system or protocol module of the computing device 110a) that the access point 132 being used to access the network has been changed (or may be notified of the device identifier of access point 132b now being used to access the network 130). Access control module 114a may then determine the device identifier associated with the access point 132b being used by the computing device 110a to access network 130 (if it was not provided to the access control module 114a).

The access control module 114a of the application 112a may then determine access control data associated with that device identifier (e.g., the device identifier for access point 132b). Specifically, an access control list may be accessed to see if that device identifier (e.g., for access point 132b) matches any of the device identifiers listed in the access control list. As access point 132b is not controlled by, or known to, the enterprise, the device identifier for access point 132b may not be listed in the access control list.

As, in this example, the device identifier for access point 132b is not in the access control list, a default level of access may be used as access control data. Here, the default access control is to deny all access by an application to application data 128. Accordingly, access control module 114a may deny application 112a any access to application data 128 on the platform 120 based on the fact that an unknown access point 132b is now being used to access the network 130.

As can be seen from the above example, using embodiments as presented herein, accesses of the same application 112 on two different devices 110 may be controlled differently or similarly based on the access point each device 110 and application is using to access the network 130.

In some embodiments, the access control data may specify access based not only on an access point identifier, but also on other information. For example, some embodiments may additionally make use of environmental information. This may include, for example, temperature, a geographical (e.g., GPS) coordinate, whether the user device is able to detect a particular network, whether other access devices are detected, and route tracing, e.g., based on whether a path to a target server is acceptable. This may be based, for example, on how many "hops" or links between access devices or servers are required for the communication to the platform. Depending on what additional information the device sees, a level of access may be specified or no access at all may be allowed.

In some embodiments, an access control module 114 (or access control module 116) may determine a network path associated with communicating with platform 120, such as a trace route or other path. Aspects of the path, such as IP addresses, domains, countries, hops or other information that can be discovered about the network path, including intermediate hops, between computing device 110 and platform 120 may be used determine the level of access. Even if access is not restricted based on the gateway 132, access may be restricted based on the network path.

Furthermore, each application 112 and 116 on computing device 110a that participates in the access control process may have its own access control module. This may be useful in devices in which independent applications are sandboxed such that control to system resources and user data of a device 110 is restricted on a per application basis. However, in other cases, one access control module in the embodiment of FIG. 1 and other embodiments discussed herein may control access for multiple applications.

As the nature of network access and network infrastructure is in constant flux, it may be important to ensure access to a current access control list or other access control data to provide the ability to update the access control list or access control data (e.g., associated with device identifiers on the access control list or default access control data for device identifiers not on the list, etc.). Certain architectures may serve to accomplish one or more of these goals, among others.

Figure 2:
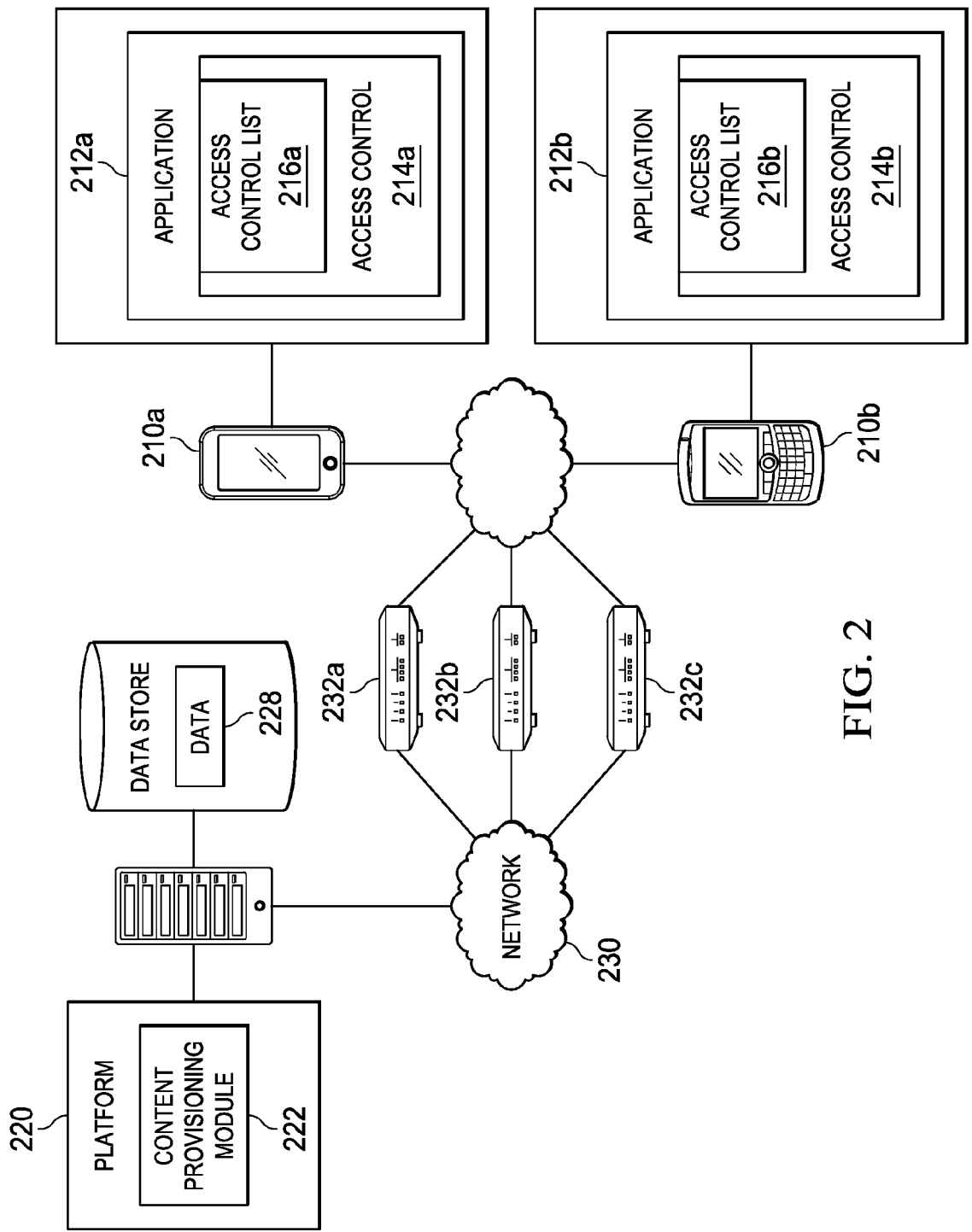
FIG. 2 is a block diagram illustrating one embodiment of an architecture for access control.

One embodiment of just such an architecture is depicted in FIG. 2. In particular, FIG. 2 depicts one embodiment of an architecture for access controls where an access control list is included in an application deployed on a device. The architecture includes one or more computing devices 210 (computing device 210a, computing device 210b) connected to a content provisioning platform 220 over a network 230. Computing devices 210 may access network 230 using an access point 232 (e.g., access point 232a, access point 232b, access point 232c). Such an access point 232 may communicate with computing device 210 wirelessly or over a wired network to allow computing device 210 to connect to network 230 and may include a device identifier as discussed above.

Platform 220 may include one or more content provisioning modules 222 that support access from applications 212 (e.g., application 212a or application 212b) on a computing device 210. Again, as discussed, it may be desired to restrict an application's 212 access to platform 220 or data 228 in data store 221 based on which access point 232 the device 210 on which application 212 resides is using to access the network 230. To control such access application 212 may include an access control module 214 (e.g., access control module 214a, access control module 214b). The access control module 214 may include access control list 216 (e.g., access control list 216a, access control list 216b) comprising one or more device identifiers and associated access control data. The access control list 216 may, for example, be included with an application when the application is created, installed, updated or otherwise deployed on a user's computing device.

When the application 212 on the computing device 210 is activated, or when the application first attempts to access data 228 at platform 220, etc., access control module 214 may be activated. Access control module 214 is configured to determine the device identifier associated with the access point 232 being used by the computing device 210 to access network 230. When the access control module 214 of the application 212 determines the device identifier for the access point 232 being used to access the network 230 it may then determine access control data associated with that device identifier.

More particularly, in one embodiment, access control module 214 may access access control list 216 to determine if the device identifier for the access point 232 matches any of the device identifiers in the access control list 216 and if the device identifier is in the access control list 216 the access control data associated with the device identifier determined for the access point 232 may be determined. If the device identifier determined for the access point 232 is not in the access control list 216 a default level of access may be used as the access control data (e.g., deny all access, permit only read access, etc.).

Once the access control data associated with the device identifier for the access point 232 is determined, the access control module 214 of the application 212 may control access by the application 212 to the application data 228 in accordance with the determined access control data as discussed.

As noted above, the nature of network access and network infrastructure may be extremely dynamic. Thus, it may be desired that the access control list used to control access by an application may be current or accurate. Accordingly, it may be desirable to provide the ability to update the access control list or obtain current access control data when desired.

Figure 3:
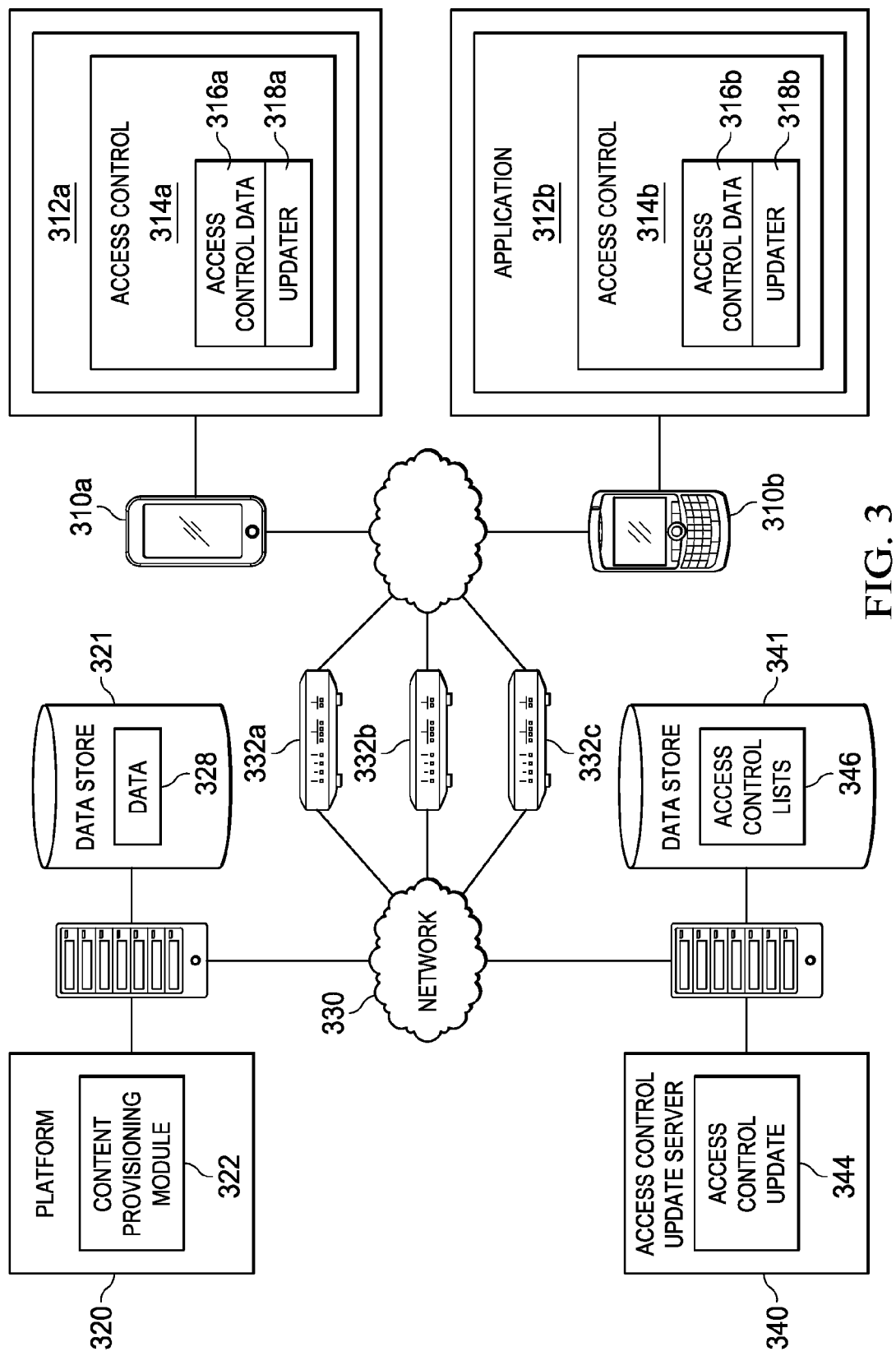
FIG. 3 is a block diagram illustrating one embodiment of an architecture for access control.

FIG. 3 depicts one embodiment of an architecture for access controls where an access control list is obtained by an application deployed on a device. The architecture includes one or more computing devices 310 (e.g., computing device 310a, computing device 310b) connected to a content provisioning platform 320 over a network 330. Computing devices 310 may access network 330 using an access point 332 (e.g., access point 332a, access point 332b, access point 332c). Such an access point 332 may communicate with computing device 310 wirelessly or over a wired network to allow computing device 310 to connect to network 330 and may include a device identifier as discussed above.

Platform 320 may include one or more content provisioning modules 322 that support access from applications 312 (e.g., application 312a, application 312b) on a computing device 310. Again, as discussed, it may be desired to restrict application's 312 access to platform 320 or data 328 in a data store 321 based on which access point 332 the device 310 on which application 312 resides is using to access the network 330.

When the application 312 on the computing device 310 is activated, or when the application first attempts to access data 328 at platform 320, etc., access control module 314 (e.g., access control module 314a, access control module 314b) may be activated. Access control module 314 is configured to determine the device identifier associated with the access point 332 being used by the computing device 310 to access network 330. When the access control module 314 of the application 312 determines the device identifier for the access point 332 being used to access the network 330 it may then determine access control data associated with that device identifier.

More specifically, access control module 314 may include updater module 318 (e.g., updater module 318a, updater module 318b). When access control module 314 is activated, updater module 318 may send a request for an access control list to access control update server 340 (e.g., either, before, simultaneously with, or after determining a device identifier for access point 332 or network path information). This request may, for example, include an identifier of the application 314 making the request or other identifying information such as the device identifier for an access point 332, an identifier of a user or device 310, network path information for the network path between computing device 310 and platform 320, etc.

When this request is received at access control update server 340, access control updater module 344 may determine an appropriate access control list or other access data based on the request (e.g., a access control list associated with the application 314) from one or more access control lists 346 stored in the data store 341 of the access control update server 340. The access control updater module 344 may then return this access control list to the requesting access control module 314.

When this access control list is received by the access control module 314, the access control module 314 may store the received access control list 316 (e.g., as access control list 316a or access control list 316b) (e.g., overwriting any previous version of the access control list, if any existed). It will be noted that an update to the access control list 316 of the application 314 may occur based on a wide variety of criteria and that these updates to the access control list may be time-based updates (e.g., at regular intervals), event-based updates, security breach based updates, or may occur based on other events or criteria. It will also be noted that such updates may occur based on a request of access control module 314 or an updated access control list 316 may be sent from access control updater 344 when it is determined that an update should occur (e.g., without receiving a request from access control module 314). In this manner, an access control list 316 for an application 314 may be kept current such that access to application data 328 may be better controlled.

In any event, once the access control list 316 is received and stored by the access control module 314 it may be used to control access to application data 328. Specifically, in one embodiment, access control module 314 may access access control list 316 to determine if the device identifier for the access point 332 matches any of the device identifiers in the access control list 316 and the access control data associated with the device identifier determined for the access point 332. If the device identifier determined for the access point 332 is not in the access control list a default level of access may be used as the access control data (e.g., deny all access, permit only read access, etc.).

Furthermore, access control module 314 may compare various aspects of a network path to determine access control data associated with the aspects. For example, access control module 314 may compare IP addresses of devices in the network path, number of hops, countries through which the network path passes, or other aspects of the network path to determine additional access control data to apply. Thus, while access through a particular gateway may be permitted, access control module 314 may restrict access by an application 312 based on the intermediate network devices through which communications with platform 320 will pass.

Once the access control data associated with the device identifier for the access point 332 or network path is determined, the access control module 314 of the application 312 may control access by the application 312 to the application data 328 in accordance with the determined access control data as discussed.

While it may be useful to have an access control list stored in conjunction with an application on a device, in some cases a user may have many applications on their device, or access control lists may be rather large. In these instances, storing an access control list in conjunction with each application on a device may become time or space prohibitive. Accordingly, in certain embodiments, such access control lists may not be maintained by applications and instead access control data may be obtained by an application as it is needed.

Figure 4:
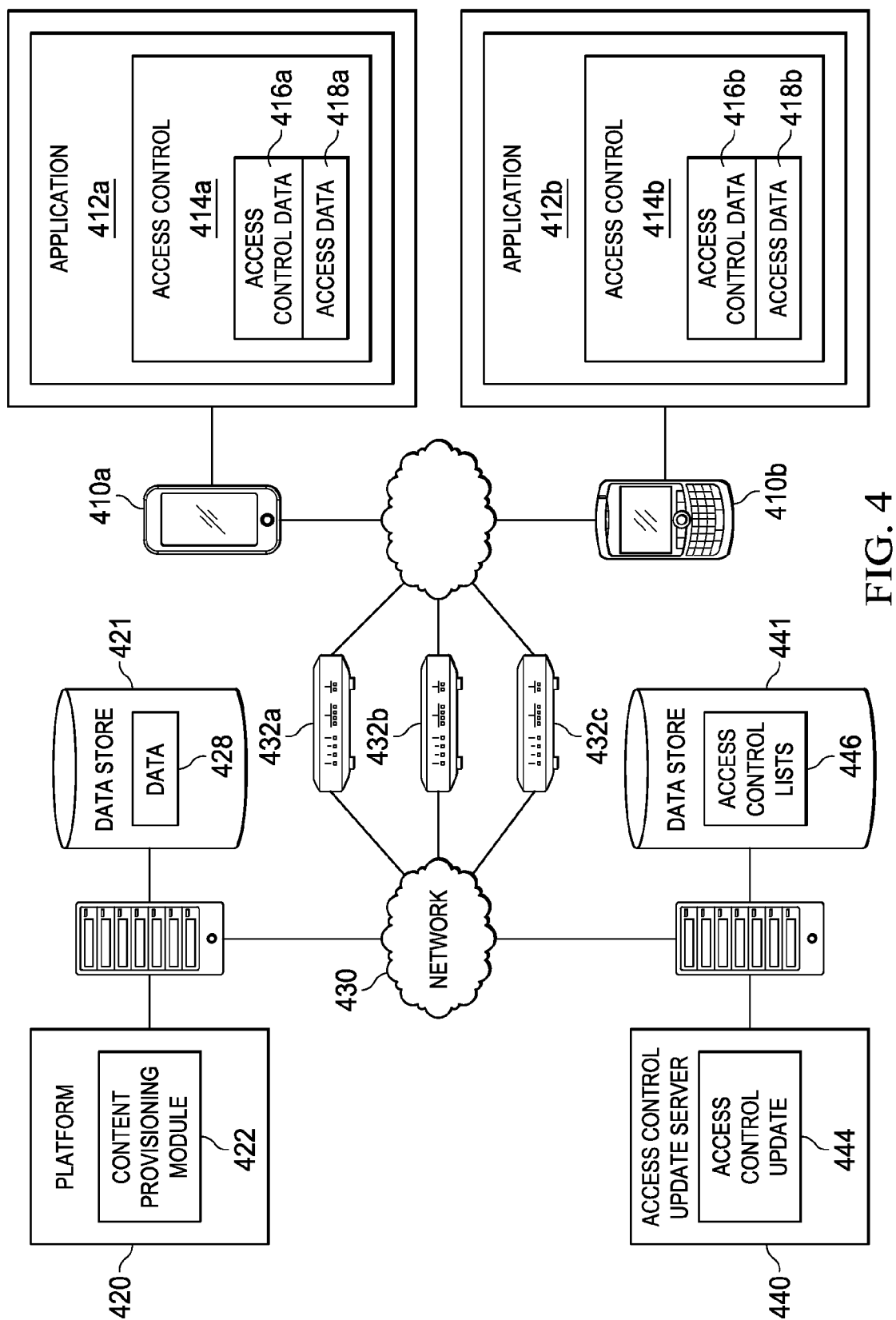
FIG. 4 is a block diagram illustrating one embodiment of an architecture for access control.

FIG. 4 depicts one embodiment of an architecture for access controls where access control data is obtained by an application deployed on a device. The architecture includes one or more computing devices 410 (computing device 410a, computing device 410b) connected to a content provisioning platform 420 over a network 430. Computing devices 410 may access network 430 using an access point 432 (e.g., access point 432a, access point 432b, access point 432c). Such an access point 432 may communicate with computing device 410 wirelessly or over a wired network to allow computing device 410 to connect to network 430 and may include a device identifier as discussed above.

Platform 420 may include one or more content provisioning modules 422 that support access from applications 412 on a computing device 410 to data in data store 421. Again, as discussed, it may be desired to restrict application's 412 (e.g., application 412a, application 412b) access to platform 420 or data 428 based on which access point 432 the device 410 on which application 412 resides is using to access the network 430.

When the application 412 on the computing device 410 is activated, or when the application first attempts to access data 428 at platform 420, etc., an access control module 414 (e.g., access control module 414a, access control module 414b) may be activated. The access control module 414 is configured to determine the device identifier associated with the access point 432 being used by the computing device 410 to access network 430. When the access control module 414 of the application 412 determines the device identifier for the access point 432 being used to access the network 430 it may then determine access control data associated with that device identifier.

More specifically, access control module 414 may include access data module 418 (e.g., access data module 418a, access data module 418b). When access control module 414 has determined the device identifier for the access point 432 being used to access the network 430, access data module 418 may send a request for access control data to access control update server 440. This request may, for example, include an identifier of the application 414 making the request, the device identifier determined for the access point 432 being utilized to access the network 430, network path information for the network path between computing device 410 and platform 420, etc.

When this request is received at access control update server 440, access control updater module 444 may determine appropriate access control data based on the request (e.g., a access control data associated with both the application 414, the device identifier for the access point 432, the network path information) using one or more access control lists 446 stored in the data store 441 of the access control update server 440. In one embodiment, the access control updater module 444 may first determine an access control list of the access control lists 446 that is associated with the application 414 and then access that access control list to determine if the device identifier for the access point 432 received in the request matches any of the device identifiers in that access control list. If the device identifier is in the access control list, the access control data associated with the device identifier for the access point 432 may be determined. Furthermore, access control updater module 444 may determine if there is any access control data associated with other devices in the network path. If the device identifier for the access point 432 is not in the access control list and there are no restrictions based on the network path, a default level of access may be used as the access control data (e.g., deny all access, permit only read access, etc.).

The access control updater module 444 may then return the determined access control data to the requesting access control module 414 in response to the request. When this access control data is received by the access control module 414, the access control module 414 may store this data (e.g., as access control data 416a or access control data 416b) and control access to application data 428 in accordance with the received access control data 416. In this manner, access control data 416 can be obtained as it is needed, obviating the need to store access control lists in conjunction with the applications 414 on the device 410 itself.

As noted above, in some embodiments, the computing device may send the device identifier of the access point along with additional information to the backend system or provisioning platform related to, for example, whether the computing device can see other access points, the network via which it is connecting, and the like. In such embodiments, the computing device may additionally send its unique identifier so that once an access module associated with the provisioning platform confirms the device on behalf of one application, it can log in to the provisioning platform on behalf of additional applications, without separate credentialing.

Figure 5:
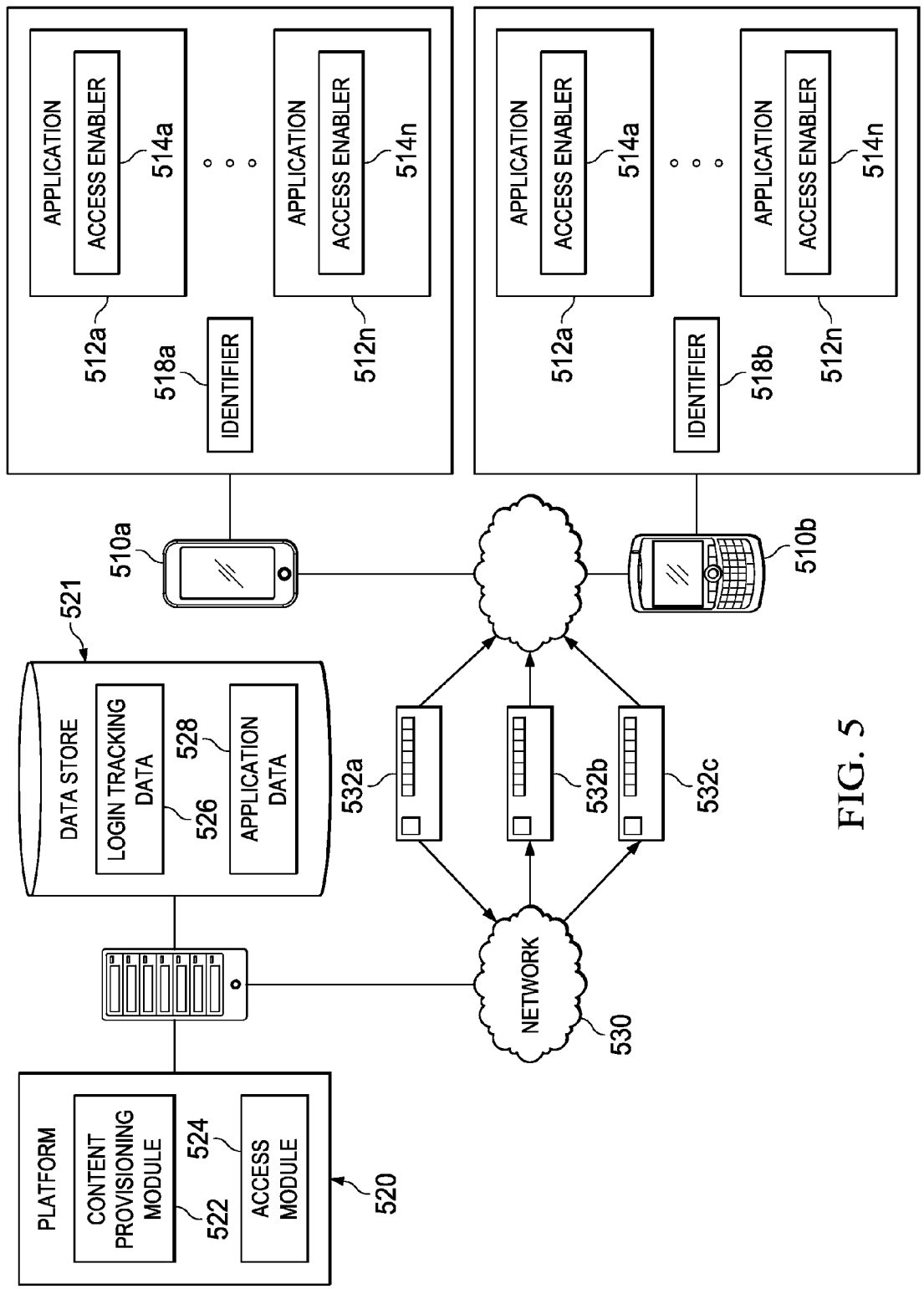
FIG. 5 is a block diagram illustrating one embodiment of an architecture for access control.

Referring now to FIG. 5, one embodiment of an architecture for access controls is depicted. The architecture includes one or more computing devices 510 (e.g., computing device 510a and computing device 510b) connected to a content provisioning platform 520 over a network 530. The network 530 may be a wired or wireless network such as the Internet, an intranet, a LAN, a WAN, a cellular network, another type of network. It will be understood that network 530 may be a combination of multiple different kinds of wired or wireless networks.

Computing devices 510 may access network 530 using an access point 532 (e.g., access point 532a, access point 532b, access point 532c). Such an access point 532 may communicate with computing device 510 wirelessly to allow computing device 510 to connect to network 530 and may include a device identifier as discussed above.

Platform 520 may include one or more content provisioning modules 522 that support access from applications 512 (e.g., applications 512a, 512n) on a computing device 510. Again, as discussed, it may be desired to restrict application 512's access to platform 520 or data 528 in a data store 521 based on a geographical location of the device and/or access point 532 the device 510 on which application 512 resides is using to access the network 530. The platform 520 may thus include an access module 524 that may be configured to receive requests for access from applications 512, determine if a user at a computing device 510 has been authenticated, request and receive user credentials, authenticate a user, access (including store) login tracking data 526 and allow (or deny) access to content provisioning module 522.

When the application 512 (e.g., application 512a, application 512n) on the computing device 510 is activated, or when the application first attempts to access data 528 at platform 520, etc., access control module 514 (e.g., access control module 514a, 514n), also referred to as access enabler module 514, may be activated. Access control module 514 is configured to determine the device identifier associated with the access point 532 being used by the computing device 510 to access network 530. When the access control module 514 of the application 512 determines the device identifier for the access point 532 being used to access the network 530 it may additionally access its identifier 518 (e.g., identifier 518a for computing device 510a and identifier 518b for computing device 510b). Such an identifier 518 may uniquely identify the computing device 510. An identifier 518 may be, for example, a MAC address, a unique identifier associated with the SIM card of the device 510, Bluetooth ID of the device 510, a number or code placed in hardware of the device by a manufacturer of the device, etc. (or a combination thereof).

Access enabler module 514 may be configured to access the identifier 518 on the device 510, send a device identifier (which may be the same as identifier 518 or based on identifier 518) to the access module 524, receive a request for user credentials from the access module 524, send the user credentials to the access module 524, receive a login identifier from the access module 524 and provide the login identifier to an application 512 for use in accessing content from content provisioning module 522.

Accordingly, when a user of computing device 510a wishes to utilize an application 512a on his computing device 510 he may activate the application (e.g., tapping or clicking on an icon, using a command on a command line, etc.). At some point during execution of the application 512a then (e.g., on initial startup of the application 512a, when the application 512a first requires particular data, etc.) the application 512a may require access to content provisioning module 522.

When the application 512a first attempts to access content provisioning module 522, access enabler module 514a may access the identifier 518a on the computing device 510a. The access enabler module 514a may then send a request to access that application data (e.g., a request to access the content or other data associated with that application 512a) to content provisioning module 522, where the request includes a device identifier uniquely identifying that device 510. In one embodiment, access enabler module 514a may encrypt or otherwise perform an algorithmic calculation (e.g., a hash) based on the identifier 518 to generate the device identifier included with request, such that the device identifier included in the request is an encrypted, hashed or otherwise altered version of the identifier 518.

The request to access may also include the device identifier of the access point 532 the user device 510 is using to access the platform 520. In addition, the request may include additional information, such as whether the user device 510 can see other access points, the identity of the network being used by the access point, etc., and the network path used to communicate with the access module 524.

The request to access, including the device identifier is received from the user device 510 at the access module 524. When such a request is received the access module 524 may determine whether a user associated with the device 510a has been previously authenticated. This determination may be made by determining if there is any login tracking data 526 associated with the device identifier included in the request received from the application 512a.

If there is no login tracking data 526 associated with the device identifier included in the received request, the access module 524 may access the access lists 516 to determine if the access device is present and, if so, on what terms the user device 510 may be permitted to access the content provisioning module 522 or application data 528.

The access control module 524 may then send a request for a user credential to the access enabler module 514a from which the initial access request was received. Additionally, a login identifier to allow access to the content provisioning module 522 may be generated, or otherwise obtained, and returned to the access enabler module 514a in conjunction with the request for the user credential. A login identifier may be, for example a session identifier (session ID) or a web sockets identifier (web sockets ID).

The access enabler module 514a may then request a user credential from the user of the computing device 510a through the application 512a. This request may be initiated, for example, by presenting an interface (e.g., a login or authorization interface) associated with the application 512a. Such a user credential may, for example, be a username, password, an authorization token or key, etc. The access enabler module 514a can then return the provided user credential to the access module 524 along with the login identifier.

When the user credential is received at the access module 524 from the access enabler module 514a at the computing device 510 the user may be authenticated using the user credential (e.g., by comparing the received user credential to authorized user credentials). If the user cannot be authenticated, an error message may be returned to the access enabler module 514a and the access enable module 514a may attempt to repeat the authentication, deny a user access to the application 512a or take some other action.

If, however, the user credentials can be authenticated, access module 524 stores the login identifier in association with the device identifier (e.g., associated with computing device 510) received in the initial access request in login tracking data 526 to allow access to the content provisioning module 522. The application 512a may thus utilize this login identifier in subsequent accesses to content provisioning module 522 to access the application data 528 associated with the application 512a. In addition, the access module 524 may return access control data or access lists by which the application may access the platform 520.

At some subsequent point, then, a user of computing device 510a may wish to utilize a different application 512n on his computing device 510 (e.g., either simultaneously with the first application 512a or after the user has closed the first application 512a) and may activate the other application 512n (e.g., tapping or clicking on an icon, using a command on a command line, etc.). During execution of the application 512n (e.g., on initial startup of the application 512, when the application 512n first requires particular data, etc.) the application 512n may also require access to content provisioning module 522.

When this application 512n first attempts to access content provisioning module 522, access enabler module 514n may access the identifier 518a on the computing device 510. The access enabler module 514n of the application 512n may then send a request to access that application (e.g., to access the content or other data associated with that application 512n) to content provisioning module 522, where the request includes the device identifier, the device identifier of the access point, and any additional information.

In one embodiment, access enabler module 514n may generate by encrypting or otherwise perform an algorithmic calculation (e.g., a hash) based on the identifier 518a to generate the device identifier as discussed above. If such an encryption or algorithmic calculation is performed by access enabler module 514n it may be performed in the same manner (e.g., using the same encryption, hash, algorithm, etc.) as that performed by access enabler module 514a such that the device identifier is regenerated by access enabler module 514n.

The request to access the application 512n including the device identifier is received from the user device 510 at the access module 524. When this request is received the access module 524 may determine whether a user associated with the device 510 has been previously authenticated. This determination may be made by determining if there is any login tracking data 526 (or user credentials) associated with the device identifier included in the request from access enabler 514n associated with application 512n. As discussed above, as a user has been previously authenticated with respect to the access of application 512a, in this case it can be determined that a login identifier is stored in association with the device identifier received in the access request (for application 512n) in login tracking data 526. Thus, it can be determined that a user associated with device 510a has been previously authenticated.

Accordingly, the user may be allowed access to application 512n (e.g., application 512n may be allowed to access data 528 on platform 520 associated with the application 512n) in accordance with the already-received access control data and without further authentication by the user of computing device 510a based on the determination that the user has been previously authenticated. In some embodiments, new access control data is returned to the user device for use specifically with the new application 512n, but further authentication is not required.

More specifically, in one embodiment, the login identifier associated with the device identifier (received in the request from application 512n) stored in login tracking data 526 may be returned to the access enabler module 514n which, in turn, may provide this login identifier to the application 512n. The application 512n can then use this login identifier for subsequent requests to platform 520 which will respond to requests including (or otherwise referencing or associated with) the login identifier without further need for authentication. In this manner, a user may access multiple applications on his device while only being authenticated a single time.

It can be noted that an access control module, such as access control module 114, access control module 116, access control module 214, access control module 314, access control module, 414, access control module 514, can be used in conjunction with other access control mechanisms, such as access controls according to enterprise security criteria and data policies, may restrict access. Thus, an access control module may be part of a layered security solution where actual access to data may depend both on the determination of the access control module and other access controls applied at user device, a platform or elsewhere.

Figure 6:
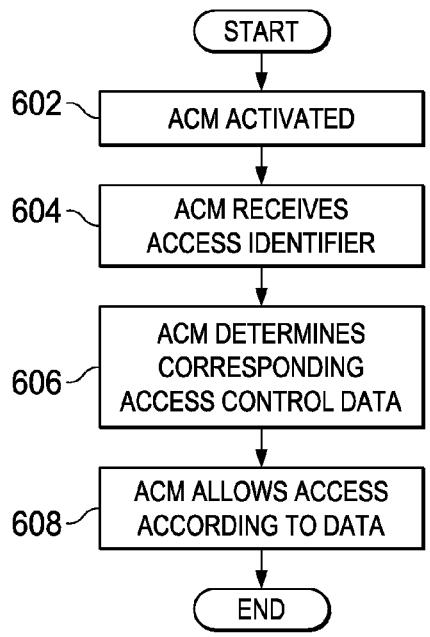
FIG. 6 is a flowchart illustrating operation of an embodiment for access control.

Turning now to FIG. 6, a flowchart illustrating operation of embodiments is shown. Initially, a user may activate an application and thus activate an access control module in step 602, which may then attempt to contact a platform via an access point. The access control module may then receive or otherwise access the access identifier of the access point in step 604. In step 606 the access control module may then determine corresponding access control data, such as via an access control list that identifies the access point and a level of access associated therewith. In some embodiments, the access control module may further obtain additional information that may pertain to access control criteria. As noted above, this may include, for example, identifying the communications path to the platform; determining the network provider; whether the access control module can "hear" another specified access point; and the like. In step 608 the access control module may then allow access according to that information and in accordance with the access control data.

Figure 7:
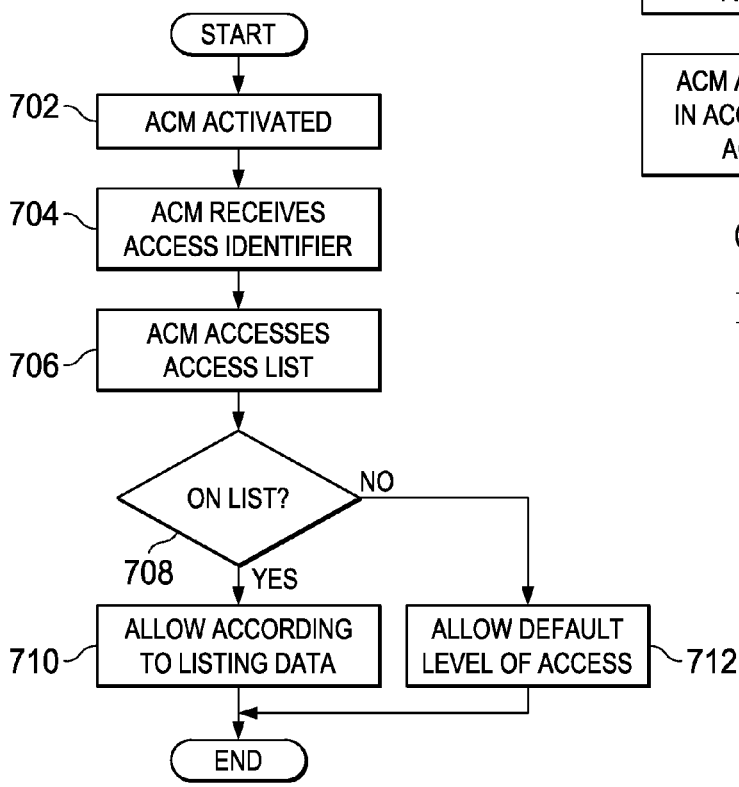
FIG. 7 is a flowchart illustrating operation of an embodiment for access control.

Turning now to FIG. 7, a flowchart illustrating operation of an embodiment is shown. Initially, in step 702, a user may activate an application and thus activate an access control module, which may then attempt to contact a platform via a portal, gateway or other access point. The access control module may then receive or otherwise access the access identifier of the access point and other information that pertains to the access control module (step 704). The access control module may access an access control list in step 706 and, in step 708, determine if the access point is on the list and if access should be restricted based on other information, such as network path information. If so, the access control module will allow the device to access a target according to the corresponding access control data (step 710). If the access point is not on the list and there is no indication that access should be restricted based on other criteria, the access control module can allow a default level of access (step 712). In some embodiments, this may include, for example, denying access altogether or applying a predetermined limit on access.

Figure 8:
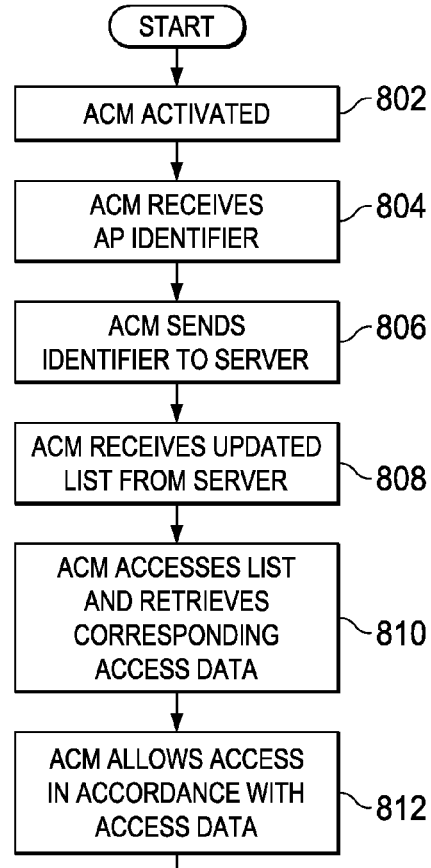
FIG. 8 is a flowchart illustrating operation of an embodiment for access control.

Shown in FIG. 8 is one method of updating an access list or access data. In step 802, a user may activate an application and thus activate an access control module, which may then attempt to contact a platform via an access point. The access control module may then may receive or otherwise access the access identifier of the access point in step 804. The access control module may send the access point identifier to the access control update server in step 806. In response, the user device's access control module may receive the updated access list from the server (step 808). The access control module may access the list and retrieve the corresponding access control data in step 810. The access control module may allow access in accordance with the access control data in step 812.

Figures 9, 10:
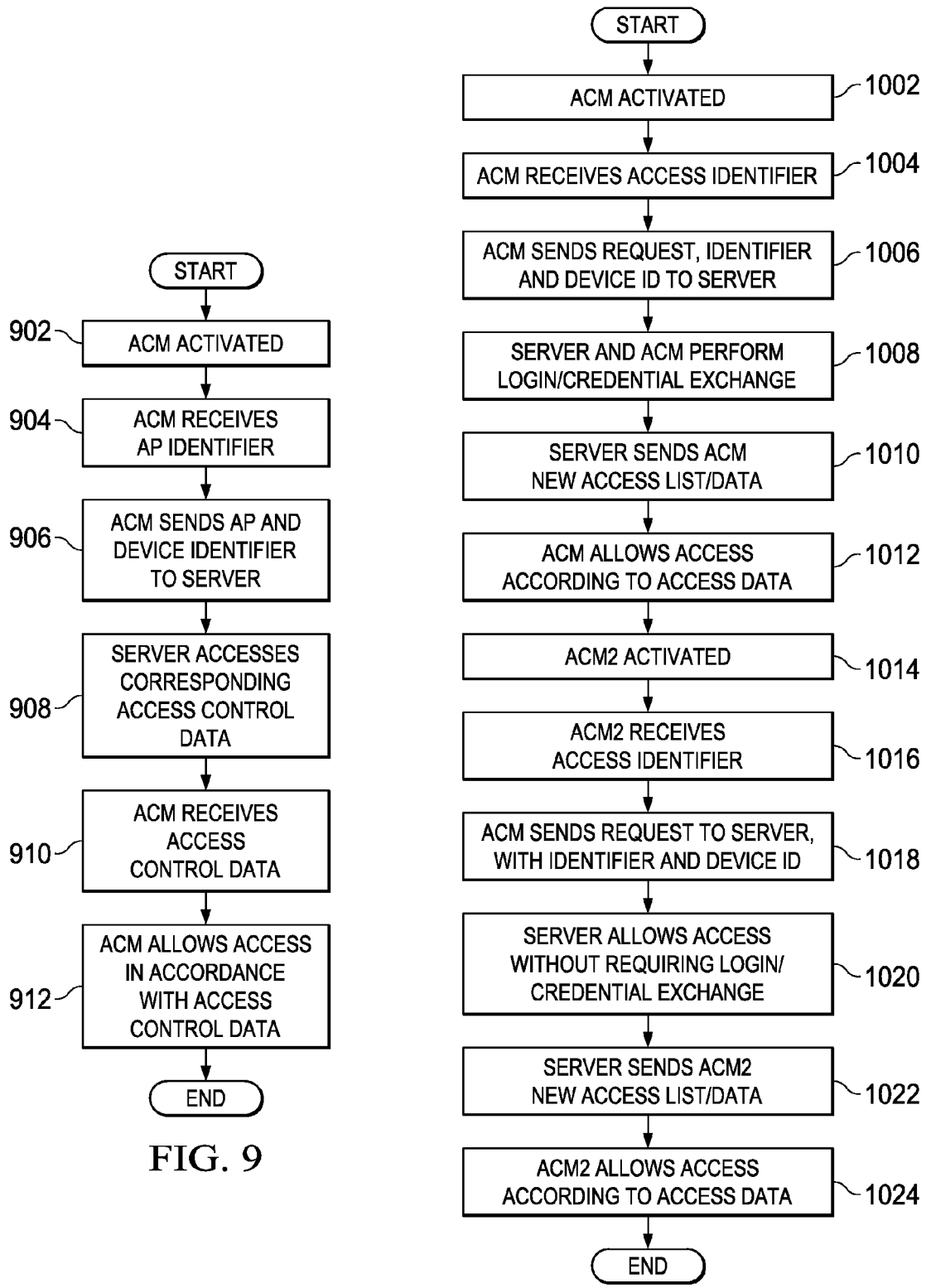
FIG. 9 is a flowchart illustrating operation of an embodiment for access control.
FIG. 10 is a flowchart illustrating operation of an embodiment for access control.

Shown in FIG. 9 is a method of access control in accordance with embodiments. At step 902, a user may activate an application and thus activate an access control module, which may then attempt to contact a platform via an access point. The access control module may receive or otherwise access the access identifier of the access point in a step 904. The access control module may send the access point identifier, the device identifier, network path information and other information to the platform server in step 906. In step 908 the platform server may use the device identifier, access point identifier, network path information or other information to determine appropriate access control data for the device. The platform can send the access control data to the access control module in step 910. The access control module may allow the application access to the platform in accordance with the access control data in step 912.

Turning now to FIG. 10, a flowchart illustrating operation of another embodiment is shown. At step 1002, a user may activate an application on a user device and thus activate an access control module. The access control module may receive the access device identifier of the access point being used to access the network in step 1004. In step 1006, the access control module may then send a request for access to the platform access module, along with the access point identifier, the user device identifier, and any additional data. The platform maintaining the access module and the access control module can perform a login/credential exchange at step 1008. If authenticated, the access module may then send the access control module the corresponding new access list or access control data in step 1010. The access control module may then allow access by the application through the access point in accordance with the access control data (step 1012).

Some time later, in step 1014, a second application may be opened and its access control module may be activated. This access control module may then receive the access point identifier, as well as the device identifier and any additional information in a step 1016. The access control module may send the request for access to the platform to the access module, along with the device and access point identifiers and other information in step 1018. In step 1020, the access module may allow the access without requiring a new login/credential exchange. The access module may then send the access control module the new access list and/or access control data corresponding to the second application in step 1022. In step 1024, the access control module allows the application to access the platform in accordance with the access control data.

Routines, methods, functions, steps, operations or portions thereof described herein can be implemented through control logic adapted to direct a computing device to perform the routines, methods, functions, steps, operations or portions thereof. Control logic can include computer executable instructions stored on a computer readable medium that can be operated on by a processor, hardware, firmware or a combination thereof. The control logic can include, in some embodiments, application specific integrated circuits, programmable logic devices, field programmable gate arrays, optical, chemical, biological, quantum or nanoengineered systems, components and mechanisms. Any suitable language can be used. Different programming techniques can be employed such as procedural or object oriented. Based on the disclosure and teachings provided herein, a person of ordinary skill in the art will appreciate other ways and/or methods to implement the invention.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. A processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. Moreover, it will be appreciated that in some instances some features of embodiments of the invention will be employed without a corresponding use of other features without departing from the scope and spirit of the invention as set forth.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

It is to be understood that other variations and modifications of the embodiments described and illustrated herein are possible in light of the teachings herein and are to be considered as part of the spirit and scope of the invention. Thus, while the invention has been described herein with reference to particular embodiments thereof, a latitude of modification, various changes and substitutions are intended in the foregoing disclosures, and therefore, many modifications may be made to adapt a particular situation or material to the essential scope and spirit of the invention. Accordingly, the specification, including the Summary and Abstract, and figures are to be regarded in an illustrative rather than a restrictive sense, and all such modifications are intended to be included within the scope of invention.

What is claimed is:

1. A system for controlling access, comprising:
 a computing device, configured to:
  determine a first identifier associated with a first access point at a first geographic location being used by the computing device to access a network;
  determine first access control data associated with the first identifier and a first application executing on the computing device, wherein the first access control data includes environmental data including geographical data associated with at least one of the computing device or the first access point;
  control access to data over the network by the first application based on the first access control data;
  determine a second identifier associated with a second access point at a second geographic location being used by the computing device to access the network;
  determine second access control data associated with the second identifier and the first application; and
  control access to data over the network by the first application based on the second access control data.

2. The system of claim 1, wherein determining the first access control data comprises sending a request to an access control update server and receiving the first access control data from the access control update server, the request comprising the first identifier.

3. The system of claim 1, wherein the computing device is further configured to update the first access control data by sending a request to an access control update server and receiving updated first access control data from the access control update server.

4. The system of claim 1, wherein the first application comprises an access control module configured to perform the determining of the first identifier, the determining of the access control data and the controlling of access to data.

5. The system of claim 1, wherein the first access control data includes a default level of access.

6. The system of claim 1, wherein the computing device is further configured to:
   determine third access control data, the third access control data associated with the first identifier and a second application executing on the computing device; and
   control access to data over the network by the second application based on the third access control data.

7. The system of claim 6, wherein the first access control data specifies a different level of access than the third access control data.

8. The system of claim 6, wherein the first application and second application are isolated applications.

9. The system of claim 8, wherein each of the first application and the second application comprises an access control module.

10. The system of claim 6, wherein the computing device is configured to execute an access control module that controls access to data by the first application and the second application.

11. The system of claim 1, wherein the computing device is configured to determine if access by the first application to a target server using a path to the target server should be blocked based on the path and blocking the access by the first application to the target server if it is determined that access using the path should be blocked.

12. A method for controlling access to a target platform by a computing device, comprising:
   determining a first identifier associated with a first access point at a first geographic location being used by the computing device to access a network;
   determining first access control data associated with the first identifier and a first application executing on the computing device, wherein the first access control data includes environmental data including geographical data associated with at least one of the computing device or the first access point;
   controlling access to data associated with the target platform by the first application based on the first access control data;
   determining a second identifier associated with a second access point being used by the computing device to access the network;
   determining second access control data associated with the second identifier and the first application; and
   controlling access to data over the network by the first application based on the second access control data.

13. The method of claim 12, wherein determining the first access control data comprises sending a request to an access control update server and receiving the first access control data from the access control update server; wherein the request comprises the first identifier.

14. The method of claim 12, further comprising updating the first access control data by sending a request to an access control update server and receiving updated first access control data from the access control update server.

15. The method of claim 12, wherein the application comprises an access control module configured to perform the determining of the first identifier, the determining of the access control data and the controlling of access to data.

16. The method of claim 12, wherein the first access control data includes a default level of access.

17. The method of claim 12, further comprising:
   determining third access control data, the third access control data associated with the first identifier and a second application executing on the computing device; and
   controlling access to data over the network by the second application based on the third access control data.

18. The method of claim 17, wherein the first access control data specifies a different level of access than the third access control data.

19. The method of claim 17, wherein the first application and second application are isolated applications.

* * * * *